US009573361B2

(12) United States Patent
Tsuji et al.

(10) Patent No.: US 9,573,361 B2
(45) Date of Patent: Feb. 21, 2017

(54) IMAGE-FORMING METHOD

(71) Applicant: CANON KABUSHIKI KAISHA, Tokyo (JP)

(72) Inventors: Shinsuke Tsuji, Kawasaki (JP); Tsuyoshi Kanke, Yokohama (JP); Takashi Imai, Kawasaki (JP); Yuichiro Kanasugi, Tokyo (JP); Itaru Tsuji, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/644,132

(22) Filed: Oct. 3, 2012

(65) Prior Publication Data

US 2013/0088543 A1 Apr. 11, 2013

(30) Foreign Application Priority Data

Oct. 6, 2011 (JP) ................................ 2011-222171

(51) Int. Cl.
*C09D 11/10* (2014.01)
*B41J 2/01* (2006.01)

(52) U.S. Cl.
CPC ............ *B41J 2/01* (2013.01); *B41J 2002/012* (2013.01)

(58) Field of Classification Search
None
See application file for complete search history.

(56) References Cited

U.S. PATENT DOCUMENTS

| | | | | |
|---|---|---|---|---|
| 5,407,474 | A * | 4/1995 | Airey | C09D 11/322 106/31.05 |
| 6,709,096 | B1 * | 3/2004 | Beach et al. | 347/103 |
| 2007/0046720 | A1 * | 3/2007 | Konno et al. | 347/21 |
| 2009/0128610 | A1 * | 5/2009 | Taniuchi et al. | 347/103 |
| 2010/0096596 | A1 * | 4/2010 | Lewis et al. | 252/500 |
| 2011/0242196 | A1 * | 10/2011 | Okada | B41J 2/2146 347/20 |
| 2011/0242213 | A1 * | 10/2011 | Okada et al. | 347/40 |

FOREIGN PATENT DOCUMENTS

| | | | |
|---|---|---|---|
| JP | H10-329416 | A | 12/1998 |
| JP | 2004-90595 | A | 3/2004 |
| JP | 2009-096175 | A | 5/2009 |
| JP | 2009-119723 | A | 6/2009 |

* cited by examiner

*Primary Examiner* — Alejandro Valencia
(74) *Attorney, Agent, or Firm* — Canon U.S.A. Inc., IP Division

(57) ABSTRACT

An image-forming method includes a reaction solution-applying step of applying a reaction solution containing a thickening agent and a colorant-aggregating component aggregating a colorant in ink to an intermediate transfer medium, a first ink-applying step of applying a first ink to the intermediate transfer medium provided with the reaction solution, a second ink-applying step of applying a second ink to the intermediate transfer medium provided with the first ink, and a transfer step of transferring an intermediate image formed on the intermediate transfer medium provided with the second ink to a recording medium. An ink layer formed on the intermediate transfer medium by applying the first ink thereto has a yield value of 0.5 Pa or more.

8 Claims, 2 Drawing Sheets

IMAGE-FORMING METHOD

BACKGROUND OF THE INVENTION

Field of the Invention

The present invention relates to an image-forming method.

Description of the Related Art

Japanese Patent Laid-Open No. 2004-90595 discloses an image-forming method. In the image-forming method, an image is formed in such a manner that an intermediate image is formed on a transfer body using ink and the obtained intermediate image is transferred to a recording medium. The image-forming method includes a step of applying a reaction solution containing a colorant-aggregating component aggregating a colorant in ink to the transfer body prior to a step of applying the ink to the transfer body.

The inventors have investigated an image-forming method in which an image is formed in such a manner that an intermediate image is formed on a transfer body using a reaction solution and ink and the obtained intermediate image is transferred to a recording medium as disclosed in the patent document. As a result, the inventors have found that an image obtained by the image-forming method using a plurality of inks has low recording quality in some cases.

SUMMARY OF THE INVENTION

An image-forming method according aspects of the present invention includes a reaction solution-applying step of applying a reaction solution containing a thickening agent and a colorant-aggregating component aggregating a colorant in ink to an intermediate transfer medium, a first ink-applying step of applying a first ink to the intermediate transfer medium provided with the reaction solution, a second ink-applying step of applying a second ink to the intermediate transfer medium provided with the first ink, and a transfer step of transferring an intermediate image formed on the intermediate transfer medium provided with the second ink to a recording medium. An ink layer formed on the intermediate transfer medium by applying the first ink thereto has a yield value of 0.5 Pa or more.

According to aspects of the present invention, an image-forming method capable of obtaining an image having high recording quality can be provided.

Further features of the present invention will become apparent from the following description of exemplary embodiments with reference to the attached drawings.

DESCRIPTION OF THE EMBODIMENTS

Figure 1:
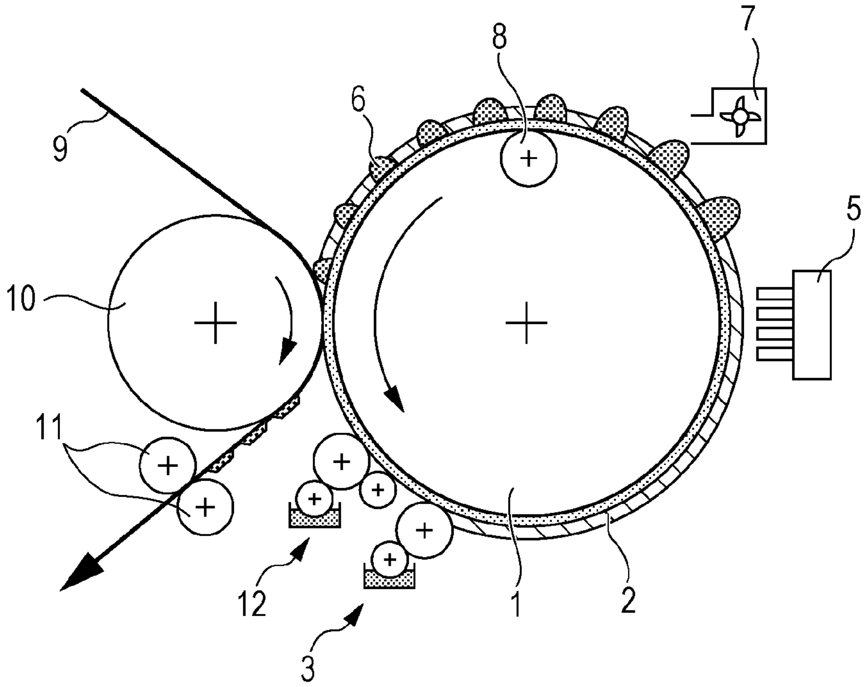
FIG. 1 is a sectional view illustrating the configuration of an image-forming apparatus.

The inventors have investigated an image-forming method in which an image is formed in such a manner that an intermediate image is formed on an intermediate transfer medium using a reaction solution and ink and the obtained intermediate image is transferred to a recording medium as described above and have also investigated the cause of the low recording quality of an image obtained by the image-forming method using a plurality of inks.

The inventors have investigated the case where an intermediate image is formed in such a manner that a first ink and a second ink are applied, in that order, to an intermediate transfer medium provided with a reaction solution containing a colorant-aggregating component. The inventors have found that dots of the second ink applied to the intermediate transfer medium subsequently to the first ink have a small size in some cases when a first ink layer does not have sufficiently low fluidity, the first ink layer being formed on the intermediate transfer medium by the reaction of the first ink with the colorant-aggregating component in the reaction solution. This is probably because since the second ink dots do not stay on the first ink layer, which does not have sufficiently low fluidity, but enter the first ink layer, the second ink dots do not scatter horizontally. If an intermediate image having regions containing such second ink dots with small sizes, that is, an intermediate image containing second ink dots with different sizes is transferred to a recording medium, an obtained image has reduced recording quality.

Therefore, aspects of the present invention provide an image-forming method in which an image is formed in such a manner that an intermediate image is formed on an intermediate transfer medium using a reaction solution and a plurality of inks including a first ink and a second ink and is then transferred to a recording medium. In the image-forming method, the variation in dot size of the second ink is reduced and an obtained image has high recording quality.

Aspects of the present invention will now be described in detail with reference to embodiments. An embodiment of the present invention provides an image-forming method in which an image is formed in such a manner that an intermediate image is formed on an intermediate transfer medium using a reaction solution and a plurality of inks including a first ink and a second ink and is then transferred to a recording medium. In the image-forming method, the variation in dot size of the second ink is reduced in such a manner that a layer of the first ink is elasticized such that the second ink does not enter the first ink layer and a layer of the second ink is deposited on the first ink layer. The elasticity of the first ink layer is represented by the yield value of an ink layer. The investigation performed by the inventors has revealed that an ink layer formed on the intermediate transfer medium by applying the first ink to the intermediate transfer medium may need to have a yield value of 0.5 Pa or more. The term "yield value" as used herein refers to the applied stress at which an elastic solid deforms and flows and means that a material with higher yield value has lower fluidity and a material with lower yield value has higher fluidity. In aspects of the present invention, the yield value is a value derived from the following Casson equation:

$$\sqrt{\tau}=\sqrt{\eta_\infty}\times\sqrt{D}+\sqrt{\tau_0}$$

where $\tau$ represents the shear stress, $\tau_0$ represents the yield value, $\eta_\infty$ represents the viscosity, and D represents the shear rate.

A method of measuring the yield value used herein is described below in detail.

In aspects of the present invention, the yield value of an ink layer is specified. However, it is difficult to directly measure the yield value of an ink layer and therefore an accurate value is not obtained. In aspects of the present invention, the yield value of a solution prepared by mixing a reaction solution with ink used is measured and the yield value of an ink layer is then indirectly derived. This procedure is described below.

A solution mixture is prepared in such a manner that ink and a reaction solution are mixed at the same mass ratio as the mass ratio of the ink and reaction solution actually used to record an image. For example, in the case of ejecting the ink and the reaction solution at a duty of 100% and 20%, respectively, the solution mixture is prepared in such a manner that the ink and the reaction solution are mixed at a mass ratio 100:20. The solution mixture is measured for shear stress ($\tau$) at a plurality of preset shear rates (D) using an E-type viscometer, RE-80L, available from Toki Sangyo Co., Ltd. Obtained data is plotted on the x-y plane in which the x-axis represents the shear rate and the y-axis represents the shear stress. The plot is extrapolated into a straight line by linear approximation. The equation of the straight line is determined on the x-y plane. According to the Casson equation, the slope and y-intercept of the straight line are the square root ($\sqrt{\eta_\infty}$) of the viscosity and the square root ($\sqrt{\tau_0}$) of the yield value. Therefore, the yield value can be calculated in such a manner that the y-intercept thereof is determined and is then squared. In examples below, the yield value is calculated as described above.

As a specific way to achieve the yield value specified herein, the following step or combination is necessary prior to a step of applying the first ink or second ink: a reaction solution-applying step of applying a reaction solution containing a thickening agent and a colorant-aggregating component aggregating a colorant in ink or a combination of a thickening solution-applying step of applying a thickening solution containing a thickening agent and a reaction solution-applying step of applying a reaction solution containing a colorant-aggregating component aggregating a colorant in ink. In the latter case, the sequence of the thickening solution-applying step and the reaction solution-applying step is not important. The former case, in which the reaction solution containing the thickening agent and the colorant-aggregating component is applied, may be provided because the image-forming method can be simplified by combining the thickening solution-applying step and the reaction solution-applying step into one.

FIG. 1 is a sectional view illustrating the configuration of an example of an image-forming apparatus using the image-forming method. An intermediate transfer medium 1 is a rotator and includes a surface layer 2. The intermediate transfer medium 1 is surrounded by units for performing an elementary process, that is, a reaction solution-applying section 3 for applying the reaction solution containing the thickening agent and the colorant-aggregating component, an inkjet head 5 ejecting a plurality of inks including the first and second inks to form an intermediate image 6, and a transfer roller 10 for transferring the intermediate image 6 to a recording medium 9. A moisture-removing section 7 and a heating section 8 may be placed between the inkjet head 5 and the transfer roller 10 for the purpose of reducing moisture in the intermediate image 6. A cleaning section 12 for removing the reaction solution and inks remaining on the intermediate transfer medium 1 may be placed between the transfer roller 10 and the reaction solution-applying section 3. Fixing rollers 11 for fixing a transferred image to the recording medium 9 in a short time may be arranged.

The intermediate transfer medium 1 rotates in the direction indicated by the arrow shown in FIG. 1. The reaction solution is applied to the surface layer 2 of the intermediate transfer medium 1 with the reaction solution-applying section 3. Inks are applied to the surface layer 2 with the inkjet head 5 depending on image data, whereby intermediate image 6 is formed. Moisture in the intermediate image 6 may be reduced with the moisture-removing section 7 and heating portion 8 prior to the transfer thereof. The intermediate image 6 is transferred to a recording surface of the recording medium 9 with the transfer roller 10. After being transferred, the intermediate transfer medium 1 may be surface-cleaned with the cleaning section 12. The rotation of the intermediate transfer medium 1 is repeated with the above operations combined into one cycle, whereby an image can be repeatedly formed on the recording medium 9.

The intermediate transfer medium 1 may be roller-shaped or belt-shaped. The intermediate transfer medium 1 may be a drum-shaped body, made of a light metal material such as an aluminum alloy, having rigidity sufficient to withstand pressure during transfer and the effect of significantly reducing the inertia of rotation.

The surface layer 2 of the intermediate transfer medium 1 may be made of an ink absorbent material in the case of not repeatedly using the intermediate transfer medium 1 and may be made of an ink nonabsorbent material in the case of repeatedly using the intermediate transfer medium 1. The ink absorbent material may be provided because absorbed ink can be removed from the ink absorbent material in a cleaning step and the ink absorbent material can be repeatedly used. The surface layer 2 of the intermediate transfer medium 1 may be made of a processed material having increased releasability, because such a material has high transfer efficiency and is easy to clean. The term "releasability" as used herein refers to a property that a reaction solution component or ink applied to a surface is readily removed therefrom. When the surface layer 2 of the intermediate transfer medium 1 has high releasability, the surface layer 2 has high transfer efficiency and is easy to clean; however, ink or the reaction solution is likely to be repelled and the intermediate image 6 is unlikely to be held in some cases. Thus, the surface layer 2 may have a critical surface tension of 30 mN/m or less or a contact angle of 75 degrees or more with respect to water. In particular, the surface layer 2 is formed by applying Teflon® or silicone oil to a surface of the intermediate transfer medium 1.

The reaction solution-applying section 3 may use a coating process or an inkjet process. A roll coater is exemplified in FIG. 1. This embodiment is not limited to the roll coater. A spray coater, a slit coater, and the like can be used in this embodiment in addition to the roll coater.

The inkjet head 5 includes a large number of nozzles ejecting ink by an inkjet process. Examples of the inkjet process include a thermal process, a piezoelectric process, an electrostatic process, and a MEMS process. The inkjet head 5 may be a line head or a serial head.

An operation of forming the intermediate image 6 on the intermediate transfer medium 1 to transfer the intermediate image 6 can be roughly divided into four steps: Steps (a) to (d). The steps are described below in detail one by one. FIGS. 2A to 2E show the condition of an intermediate transfer medium surface processed in Steps (a) to (c). The term "intermediate transfer medium surface" as used herein refers to a surface of the surface layer 2 of the intermediate transfer medium 1.

(a) Reaction Solution-Applying Step

Figure 2A:
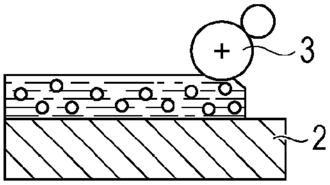
FIGS. 2A to 2E are illustrations showing a process of forming an intermediate image to transfer the intermediate image.

In Step (a), the reaction solution, which contains the thickening agent and the colorant-aggregating component aggregating the colorant in ink, is applied to the surface layer 2 of the intermediate transfer medium 1 using the reaction solution-applying section 3 (see FIG. 2A).

The yield value of the reaction solution unapplied to the intermediate transfer medium 1 may be 2.5 Pa or less. When the yield value thereof is more than 2.5 Pa, the reaction solution has high viscosity and therefore cannot be uniformly applied to the intermediate transfer medium 1 in some cases.

Components contained in the reaction solution are described below.

Thickening Agent

The term "thickening agent" as used herein refers to a component that increases the viscosity of a reaction solution layer formed on the intermediate transfer medium 1 after being applied to the intermediate transfer medium 1. Before being applied to the intermediate transfer medium 1, the thickening agent present in the reduction reaction does not increase the viscosity of the reaction solution. After being applied to the intermediate transfer medium 1, the thickening agent may increase the viscosity of the reaction solution layer in such a way that water in the reaction solution layer formed on the intermediate transfer medium 1 is evaporated and therefore the concentration of the thickening agent is increased.

The thickening agent may have a viscosity increase of 10 or more as determined by the following equation:

$$X=Y/Z$$

where X is the viscosity increase of the thickening agent, Y is the viscosity of a 1.0 mass percent aqueous solution of the thickening agent as determined with an E-type viscometer at a rotational speed of 2.5 rpm and a temperature of 25° C., and Z is the viscosity of a 0.1 mass percent aqueous solution of the thickening agent as determined with the E-type viscometer at a rotational speed of 2.5 rpm and a temperature of 25° C. When the viscosity increase thereof is 10 or more, a liquid layer formed on the intermediate transfer medium 1 is likely to have a yield value of 5.0 Pa or more in Step (b) below, that is, a heating step of heating the intermediate transfer medium 1 provided with the reaction solution.

The content of the thickening agent in the reaction solution may be 0.01% to 10% by mass. When the content thereof is more than 10% by mass, the reaction solution is likely to have a yield value of more than 2.5 Pa; hence, the reaction solution has high viscosity and therefore cannot be uniformly applied to the intermediate transfer medium 1 in some cases as described above.

The thickening agent may be a polysaccharide. Examples of the polysaccharide include starch, cellulose, guar gum, locust bean gum, fenugreek gum, Tara gum, curdlan, and carrageenan. In particular, the thickening agent may be a cationic polysaccharide. This is because the cationic polysaccharide is likely to react with an anionic polymer used in ink to aggregate. The cationic polysaccharide is a cationized one produced by positively charging a polysaccharide. Examples of the cationic polysaccharide include polysaccharides combined with an amino group and an amine salt; natural polysaccharides, such as chitosan, containing an amino group; quaternary or ternary nitrogen-containing halides such as glycidyltrimethylammonium chloride, 3-chloro-2-hydroxypropyltrimethylammonium chloride, 3-chloropropyltrimethylammonium chloride, and glycidyltriethylammonium chloride; halohydrins; and epoxides.

In aspects of the present invention, the polysaccharide may have a weight-average molecular weight of 100,000 to 10,000,000 such as 200,000 to 8,000,000.

Colorant-Aggregating Component

The term "colorant-aggregating component" as used herein refers to a component that aggregates a colorant in ink when the reaction solution is contacted with the ink. The colorant-aggregating component increases the viscosity of ink and therefore the intermediate image 6 is readily fixed on the intermediate transfer medium 1.

The colorant-aggregating component may be a polyvalent metal ion or an organic acid.

Examples of the polyvalent metal ion include divalent metal ions such as $Ca^{2+}$, $Cu^{2+}$, $Ni^{2+}$, $Mg^{2+}$, and $Zn^{2+}$ and trivalent metal ions such as $Fe^{3+}$ and $Al^{3+}$. These ions may be used alone or in combination. The polyvalent metal ion may be contained in the reaction solution in the form of a salt. Examples of an ion that forms a salt with the polyvalent metal ion include $Cl^-$, $NO_3^-$, $SO_4^{2-}$, $I^-$, $Br^-$, $ClO_3^-$, and $RCOO^-$, where R is an alkyl group containing 1 to 20 carbon atoms. The content of the polyvalent metal ion in the reaction solution may be 5.0% to 70.0% by mass.

The organic acid may be a carboxylic acid, a sulfonic acid, or the like. In particular, the organic acid may be selected from the group consisting of polyacrylic acids, acetic acid, acid, methanesulfonic acid, glycolic acid, malonic acid, malic acid, maleic acid, ascorbic acid, succinic acid, glutaric acid, fumaric acid, citric acid, tartaric acid, lactic acid, sulfonic acids, orthophosphoric acid, pyrrolidonecarboxylic acid, pyronecarboxylic acid, pyrrolecarboxylic acid, furancarboxylic acid, pyridinecarboxylic acid, coumaric acid, thiophenecarboxylic acid, and nicotinic acid and the group consisting of derivatives of these compounds and salts of these compounds. These compounds may be used alone or in combination.

In the case of using the organic acid, the reaction solution may have a pH of 1.0 to 4.0, such as 1.0 to 3.5, and even 1.0 to 3.0. The content of the organic acid in the reaction solution may be 40.0% to 90.0% by mass.

Resin

In order to increase transfer efficiency or the fastness of an obtained image, the reaction solution may contain resin. The resin can coexist with the colorant-aggregating component and is not particularly limited. The resin may be polyvinyl alcohol (PVA), polyvinyl pyrrolidone (PVP), oxazoline, or carbodiimide.

Surfactant

In order to enhance the wettability of the intermediate transfer medium 1, the reaction solution may contain a surfactant. When the reaction solution contains the surfactant, the surface energy of the intermediate transfer medium 1 is increased by applying the reaction solution to the intermediate transfer medium 1; hence, the reaction solution is unlikely to be repelled.

Examples of the surfactant include cationic surfactants, anionic surfactants, nonionic surfactants, amphoteric surfactants, fluorinated surfactants, and silicone surfactants. The surfactant can be selected from these surfactants depending on the surface layer 2 of the intermediate transfer medium 1. These surfactants can be used in combination. In particular, a fluorinated or silicone surfactant is highly effective and may be provided as a material.

(b) Heating Step

Step (b), that is, the heating step of heating the intermediate transfer medium 1 provided with the reaction solution may be performed subsequently to Step (a). In Step (b), a portion of a solvent contained in the reaction solution is evaporated by heating and therefore the reaction solution applied to the intermediate transfer medium 1 can form a reaction solution layer 100 with increased viscosity. This suppresses the occurrence of bleeding due to the contact of the first ink with the reaction solution layer 100.

A heating technique used is not particularly limited and may be a technique of applying hot air to the intermediate transfer medium 1, a technique of applying an infrared beam to the intermediate transfer medium 1, or the like.

In aspects of the present invention, the reaction solution layer 100 formed on the intermediate transfer medium 1 may have a yield value of 5.0 Pa or more after the heating step. In the case where the yield value of the reaction solution layer 100 is 5.0 Pa or more, an ink layer is likely to have a yield value of 0.5 Pa or more when the first ink reacts with the reaction solution layer 100 to increase in viscosity as described below.

The amount of the solvent evaporated from the reaction solution layer 100 by heating may be 10% by mass or more, such as 30% by mass or more, and even 50% by mass or more. When the amount of the evaporated solvent is less than 10% by mass, the reaction solution layer 100 has low viscosity; hence, the ink layer is unlikely to have a yield value of 0.5 Pa or more in some cases when the first ink is applied.

The reaction solution layer 100 may have a thickness of 0.1 μm to 5.0 μm. When the thickness of the reaction solution layer 100 is less than 0.1 μm, the amount of the colorant-aggregating component and the amount of the thickening agent are small; hence, the ink layer is unlikely to have a yield value of 0.5 Pa or more in some cases when the first ink is applied. When the thickness thereof is more than 5.0 μm, the retention of the intermediate image 6 on the intermediate transfer medium 1 is reduced in some cases.

The reaction solution may be applied over the intermediate transfer medium 1 or may be applied to portions of the intermediate transfer medium 1 with the inkjet head 5 depending on image data, the portions being limited to those which ink is applied.

(c) Ink-Applying Step (First Ink-Applying Sub-Step and Second Ink-Applying Sub-Step)

Figure 2B:
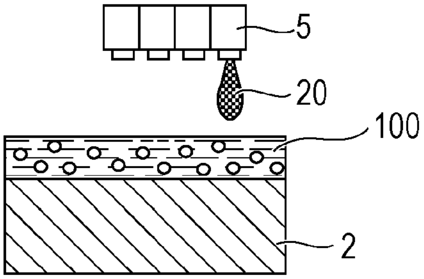
Figure 2C:
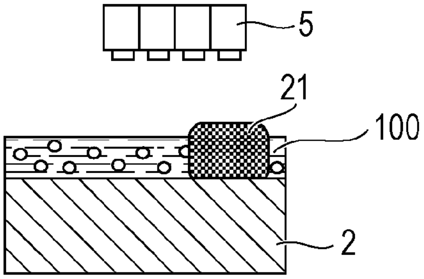
Figure 2D:
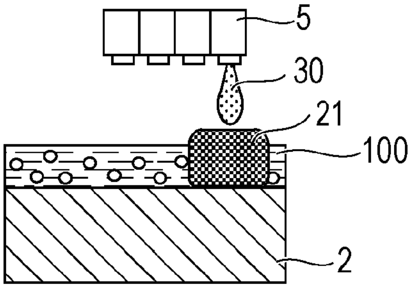
Figure 2E:
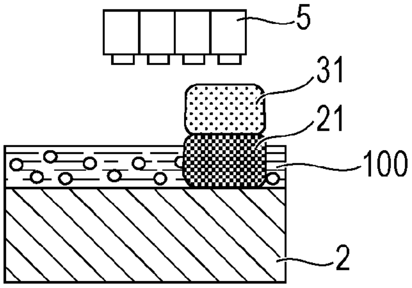

A first ink 20 corresponding to a predetermined color is ejected on the surface layer 2 of the intermediate transfer medium 1 having the reaction solution layer 100 from the inkjet head 5 depending on image data (see FIG. 2B). This allows the first ink 20 to react with the thickening agent and colorant-aggregating component contained in the reaction solution layer 100, whereby a first ink layer 21 with sufficiently reduced fluidity is formed (see FIG. 2C). Thereafter, a second ink 30 is applied to the first ink layer 21, which has sufficiently reduced fluidity (see FIG. 2D). The second ink 30 does not enter the first ink layer 21 but remains on the first ink layer 21 to form a second ink layer 31, which expands to have a predetermined dot size. Such a mechanism allows dots of the second ink 30 to have a uniform size; hence, the intermediate image 6 can be formed on the intermediate transfer medium 1 so as to have reduced variation in dot size.

In aspects of the present invention, since the second ink 30 does not enter the first ink layer 21 but remains on the first ink layer 21 to form the second ink layer 31, the yield value of the first ink layer 21, which is formed in such a manner that the first ink 20 reacts with the reaction solution layer 100 to increase in viscosity, may need to be adjusted to 0.5 Pa or more. The yield value of the first ink layer 21 may be 10 Pa or more and 50 Pa or less.

Components of ink used in Step (C) are not particularly limited and may be a dye and pigment generally used as a colorant for inks. An aqueous ink containing an aqueous medium for dissolving or dispersing the dye and the pigment can be used. In particular, the pigment may be provided because an obtained image has high fastness.

Examples of the dye include C. I. Direct Blue 6, C. I. Direct Blue 8, C. I. Direct Blue 22, C. I. Direct Blue 34, C. I. Direct Blue 70, C. I. Direct Blue 71, C. I. Direct Blue 76, C. I. Direct Blue 78, C. I. Direct Blue 86, C. I. Direct Blue 142, C. I. Direct Blue 199, C. I. Acid Blue 9, C. I. Acid Blue 22, C. I. Acid Blue 40, C. I. Acid Blue 59, C. I. Acid Blue 93, C. I. Acid Blue 102, C. I. Acid Blue 104, C. I. Acid Blue 117, C. I. Acid Blue 120, C. I. Acid Blue 167, C. I. Acid Blue 229, C. I. Direct Red 1, C. I. Direct Red 4, C. I. Direct Red 17, C. I. Direct Red 28, C. I. Direct Red 83, C. I. Direct Red 227, C. I. Acid Red 1, C. I. Acid Red 4, C. I. Acid Red 8, C. I. Acid Red 13, C. I. Acid Red 14, C. I. Acid Red 15, C. I. Acid Red 18, C. I. Acid Red 21, C. I. Acid Red 26, C. I. Acid Red 35, C. I. Acid Red 37, C. I. Acid Red 249, C. I. Acid Red 257, C. I. Acid Red 289, C. I. Direct Yellow 12, C. I. Direct Yellow 24, C. I. Direct Yellow 26, C. I. Direct Yellow 86, C. I. Direct Yellow 98, C. I. Direct Yellow 132, C. I. Direct Yellow 142, C. I. Acid Yellow 1, C. I. Acid Yellow 3, C. I. Acid Yellow 4, C. I. Acid Yellow 7, C. I. Acid Yellow 11, C. I. Acid Yellow 12, C. I. Acid Yellow 13, C. I. Acid Yellow 14, C. I. Acid Yellow 19, C. I. Acid Yellow 23, C. I. Acid Yellow 25, C. I. Acid Yellow 34, C. I. Acid Yellow 44, C. I. Acid Yellow 71, C. I. Food Black 1, C. I. Food Black 2, C. I. Acid Black 2, C. I. Acid Black 7, C. I. Acid Black 24, C. I. Acid Black 26, C. I. Acid Black 31, C. I. Acid Black 52, C. I. Acid Black 112, and C. I. Acid Black 118.

Examples of the pigment include C. I. Pigment Blue 1; C. I. Pigment Blue 2; C. I. Pigment Blue 3; C. I. Pigment Blue 15:3; C. I. Pigment Blue 16; C. I. Pigment Blue 22; C. I. Pigment Red 5; C. I. Pigment Red 7; C. I. Pigment Red 12; C. I. Pigment Red 48; C. I. Pigment Red 57; C. I. Pigment Red 112; C. I. Pigment Red 122; C. I. Pigment Yellow 1; C. I. Pigment Yellow 2; C. I. Pigment Yellow 3; C. I. Pigment Yellow 13; C. I. Pigment Yellow 16; C. I. Pigment Yellow 83; products, such as Carbon Black No. 2300, Carbon Black No. 900, Carbon Black No. 33, Carbon Black No. 40, Carbon Black No. 52, Carbon Black MA7, Carbon Black MA8, and Carbon Black MCF88, available from Mitsubishi Chemical Corporation; RAVEN 1255 available from Columbia; products, such as REAGAL 330R, REAGAL 660R, and MOGUL, available from Cabot; and products, such as Color Black FW1, Color Black FW18, Color Black S170, Color Black S150, and Printex 35, available from Degussa.

The pigment may be of a self-dispersing type, a resin-dispersing type, or a microcapsule type. A dispersant for dispersing the pigment may be a dispersing resin. Examples of the dispersing resin include water-soluble vinyl resins; block and random copolymers derived from styrene, styrene derivatives, vinylnaphthalene, vinylnaphthalene derivatives, aliphatic alcohol esters of α,β-ethylenic unsaturated carboxylic acids, acrylic acid, acrylic acid derivatives, maleic acid, maleic acid derivatives, itaconic acid, itaconic acid derivatives, fumaric acid, or fumaric acid derivatives; and salts of these compounds. The dispersing resin may have a weight-average molecular weight of 1,000 to 15,000.

In order to increase the fastness of an obtained image, the ink used may contain a water-soluble resin aside from the dispersing resin.

The ink used may contain a water-soluble solvent. Examples of the water-soluble solvent include polyethylene glycol, polypropylene glycol, ethylene glycol, propylene glycol, butylene glycol, triethylene glycol, thiodiglycol, hexylene glycol, diethylene glycol, ethylene glycol monomethyl ether, diethylene glycol monomethyl ether, and glycerin. Two or more selected from these compounds may be used in combination. The ink used may contain an alcohol such as ethyl alcohol or isopropyl alcohol or a surfactant as a component for adjusting viscosity, surface tension, or the like.

The blending ratio of components of the ink used is not particularly limited and may be appropriately adjusted depending on a selected inkjet recording method, the ejection pressure of a head, the diameter of nozzles, or the like such that the ink used can be ejected. In general, the ink used may contain 0.1% to 10% of a colorant, 0.1% to 20% of a resin component, 5% to 40% of a solvent, and 0.01% to 5% of a surfactant on a mass basis, the remainder being pure water.

(d) Transfer Step

The intermediate image 6 formed on the intermediate transfer medium 1 is transferred to the recording medium 9 with the transfer roller 10. The recording medium 9 is not particularly limited and may be, for example, a sheet of printing paper absorbing a slight amount of ink, a film absorbing no ink, or the like.

EXAMPLES

Aspects of the present invention are further described below in detail with reference to examples and comparative examples. The present invention is not limited to the examples. In descriptions of the examples, all parts and percentages are on a mass basis unless otherwise specified.

Preparation of Reaction Solutions

Reaction solutions with compositions shown in Table 1 were prepared. In Table 1, Thickening Agent 1 is hydroxyethylcellulose hydroxypropyltrimethylammonium chloride ether available under the trade name POIZ C-150 from Kao Corporation, Thickening Agent 2 is guar hydroxypropyltrimonium chloride available under the trade name Jaguar C13S from Rhodia, and Thickening Agent 3 is polyvinyl alcohol available under the trade name PVA 117 from Kuraray Co., Ltd.

TABLE 1

Composition of each reaction solution

| Reaction solutions NO. | Thickening agent Type | Thickening agent (parts) | Colorant-aggregating component Type | Colorant-aggregating component (parts) | Solvent 1,5-Pentanediol (parts) | Surfactant Type* | Surfactant (parts) | Ion-exchanged water (parts) |
|---|---|---|---|---|---|---|---|---|
| Reaction solutions (1) | Thickening Agent 1 | 0.1 | Calcium nitrate tetrahydrate | 5.0 | 1.0 | Acetylenol EH | 1.0 | 92.9 |
| Reaction solutions (2) | Thickening Agent 1 | 0.3 | Calcium nitrate tetrahydrate | 5.0 | 1.0 | BYK333 | 2.0 | 91.7 |
| Reaction solutions (3) | Thickening Agent 2 | 0.1 | Glutaric acid | 5.0 | 1.0 | Acetylenol EH | 1.0 | 92.9 |
| Reaction solutions (4) | — | 0 | Calcium nitrate tetrahydrate | 89.0 | 1.0 | Acetylenol EH | 1.0 | 9.0 |
| Reaction solutions (5) | Thickening Agent 3 | 5.0 | Calcium nitrate tetrahydrate | 5.0 | 1.0 | Acetylenol EH | 1.0 | 88.0 |
| Reaction solutions (6) | Thickening Agent 3 | 15.0 | Calcium nitrate tetrahydrate | 10.0 | 1.0 | Acetylenol EH | 1.0 | 73.0 |
| Reaction solutions (7) | Thickening Agent 3 | 5.0 | — | 0 | 1.0 | Acetylenol EH | 1.0 | 93.0 |

*Acetylenol EH: an acetylene glycol-ethylene oxide adduct available from Kawaken Fine Chemicals Co., Ltd.
*BYK 333: polyether-modified polydimethylsiloxane available from BYK Chemie Japan.

Preparation of Inks

Inks were prepared using components below. An anionic polymer below is one prepared by neutralizing a styrene-methacrylic acid-benzyl acrylate copolymer with calcium hydroxide and has an acid value of 3.6 mg-KOH/g and a weight-average molecular weight of 8,400.

| Preparation of Black Ink 1 | |
|---|---|
| Carbon Black MCF88 (available from Mitsubishi Chemical Corporation) | two parts |
| Anionic polymer | two parts |
| Glycerin | ten parts |
| Polyethylene glycol | five parts |

-continued

| | |
|---|---|
| Acetylenol EH (available from Kawaken Fine Chemicals Co., Ltd.) | one part |
| Ion-exchanged water | 80 parts |

| Preparation of Black Ink 2 | |
|---|---|
| Carbon Black MCF88 (available from Mitsubishi Chemical Corporation) | two parts |
| Glycerin | ten parts |
| Polyethylene glycol | five parts |
| Acetylenol EH (available from Kawaken Fine Chemicals Co., Ltd.) | one part |
| Ion-exchanged water | 82 parts |

| Preparation of cyan ink | |
|---|---|
| Pigment Blue 15 (available from Dainichiseika Color & Chemicals Mfg. Co., Ltd.) | two parts |
| Anionic polymer | two parts |
| Glycerin | ten parts |
| Polyethylene glycol | five parts |
| Acetylenol EH (available from Kawaken Fine Chemicals Co., Ltd.) | one part |
| Ion-exchanged water | 80 parts |

Formation of Images

Each image was formed through steps below. In each step, the yield value was measured by a method below.

(a) Reaction Solution-Applying Step

An intermediate transfer medium used was an aluminum drum, serving as a rotator, including a surface layer which was a 0.4 mm PET film coated with a silicone rubber (KE 12, available from Shin-Etsu Chemical Co., Ltd.) having a rubber hardness of 40 degrees at a thickness of 0.3 mm. Each reaction solution shown in Table 2 was applied to the intermediate transfer medium with a roll coater. The thickness of a layer of the reaction solution applied thereto was about 0.5 μm to 2.0 μm. A liquid layer formed on the intermediate transfer medium by applying the reaction solution thereto was measured for yield value.

(b) Heating Step

The intermediate transfer medium provided with the reaction solution in Step (a) was heated and dried with 50° C. hot air such that the yield value shown in Table 2 is obtained.

(c) Ink-Applying Step

After Step (b), each intermediate image was formed on the intermediate transfer medium with an inkjet head (a nozzle density of 1,200 dpi, a discharge of 3 pl, an operation frequency of 12 kHz) using a first ink and second ink shown in Table 2. In particular, a solid image (a recording duty of 100%) was formed using the first ink. A solid image (a recording duty of 10%) was then formed using the second ink so as to overlap with the solid image formed using the first ink. In this step, a first ink layer formed on the intermediate transfer medium by applying the first ink thereto was measured for yield value.

(d) Transfer Step

The intermediate image formed on the intermediate transfer medium in Step (c) was transferred to a sheet of paper, OK Prince High Quality EH, available from Oji Paper Co., Ltd.

volume fraction of the intermediate image, not transferred to a recording medium, remaining on the intermediate transfer medium surface was calculated, whereby the transferability of an image was evaluated. The evaluation results are shown in Table 3. The evaluation standards are as described below.

A: a remaining intermediate image with a volume fraction of less than 5%.

B: a remaining intermediate image with a volume fraction of 5% to less than 10%.

C: a remaining intermediate image with a volume fraction of 10% to less than 30%

TABLE 2

Yield value measured in steps in examples and comparative examples

| | Step (a) | | Step (b) | Step (c) | | |
|---|---|---|---|---|---|---|
| Examples No. | Type of reaction solution | Yield value in Step (a) (Pa) | Yield value in Step (b) (Pa) | Type of first ink | Yield value of first ink layer (Pa) | Type of second ink |
| Example 1 | Reaction Solution (1) | 0.02 | 80.00 | Black Ink 1 | 10.00 | Cyan ink |
| Example 2 | Reaction Solution (1) | 0.02 | 20.00 | Black Ink 1 | 5.10 | Cyan ink |
| Example 3 | Reaction Solution (1) | 0.02 | 5.00 | Black Ink 1 | 0.50 | Cyan ink |
| Example 4 | Reaction Solution (2) | 0.01 | 31.00 | Black Ink 1 | 2.00 | Cyan ink |
| Example 5 | Reaction Solution (3) | 0.01 | 18.00 | Black Ink 1 | 0.50 | Cyan ink |
| Example 6 | Reaction Solution (6) | 4.00 | 6.00 | Black Ink 1 | 1.00 | Cyan ink |
| Example 7 | Reaction Solution (1) | 0.02 | 30.00 | Black Ink 1 | 0.55 | Cyan ink |
| Comparative Example 1 | Reaction Solution (4) | 2.10 | 2.20 | Black Ink 1 | 0.05 | Cyan ink |
| Comparative Example 2 | Reaction Solution (5) | 0.50 | 5.50 | Black Ink 1 | 0.10 | Cyan ink |
| Comparative Example 3 | Reaction Solution (5) | 0.50 | 0.60 | Black Ink 1 | 0.005 | Cyan ink |
| Comparative Example 4 | Reaction Solution (7) | 0.20 | 6.10 | Black Ink 1 | 0.10 | Cyan ink |
| Comparative Example 5 | Reaction Solution (2) | 0.01 | 7.10 | Black Ink 2 | 0.20 | Cyan ink |
| Comparative Example 6 | Reaction Solution (1) | 0.02 | 15.00 | Black Ink 2 | 0.40 | Cyan ink |

Evaluation

In aspects of the present invention, among evaluation standards for evaluation items below, A and B are preferred levels and C and D are unacceptable levels.

Variation in Dot Size of Second Ink

The size of 20 dots of the second ink used to form the intermediate image on the intermediate transfer medium in Step (c) was measured and the standard deviation thereof was then calculated, whereby the variation in dot size of the second ink was evaluated. A larger standard deviation means that there is greater variation in dot size. The evaluation results are shown in Table 3. The evaluation standards are as described below.

A: a standard deviation of less than 0.1.

B: a standard deviation of 0.1 to less than 0.3.

C: a standard deviation of 0.3 to less than 0.5.

D: a standard deviation of 0.5 or more.

Coating Performance of Reaction Solutions

The intermediate transfer medium was visually observed after Step (a), whereby the coating performance of each reaction solution was evaluated. The evaluation results are shown in Table 3. The evaluation standards are as described below.

A: a uniform good coating with no unevenness.

B: a partly uneven coating.

Transferability of Images

A surface of the intermediate transfer medium was observed with an optical microscope after Step (d) and the D: a remaining intermediate image with a volume fraction of 30% or more.

TABLE 3

Evaluation results

| | Evaluation results | | |
|---|---|---|---|
| Examples No. | Variation in dot size of second ink | Coating performance of reaction solutions | Transferability of images |
| Example 1 | A | A | A |
| Example 2 | A | A | A |
| Example 3 | B | A | B |
| Example 4 | A | A | A |
| Example 5 | B | A | B |
| Example 6 | B | B | B |
| Example 7 | B | A | B |
| Comparative Example 1 | D | A | B |
| Comparative Example 2 | C | A | B |
| Comparative Example 3 | C | A | D |
| Comparative Example 4 | D | A | D |
| Comparative Example 5 | D | A | D |
| Comparative Example 6 | C | A | B |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-222171 filed Oct. 6, 2011, which is hereby incorporated by reference herein in its entirety.

What is claimed is:

1. An image-forming method comprising:

a reaction layer forming step of forming a reaction solution layer by applying a reaction solution containing a thickening agent increasing a viscosity of the reaction solution layer and a colorant-aggregating component aggregating a colorant in ink to an intermediate transfer medium;

a first ink layer forming step comprising applying a first ink to the reaction solution layer by an ink-jet printing method such that the first ink reacts with the reaction solution layer thereby forming the first ink layer on the intermediate transfer medium, wherein the first ink layer has a yield value of 10 Pa or more;

a second ink layer forming step comprising applying a second ink to the first ink layer by an ink-jet printing method such that the second ink does not enter the first ink layer thereby forming the second ink layer on the first ink layer; and a transfer step of transferring an intermediate image comprising the reaction solution layer, the first ink layer and the second ink layer formed on the intermediate transfer medium to a recording medium.

2. The image-forming method according to claim 1, further comprising a heating step of heating the intermediate transfer medium provided with the reaction solution prior to the first ink layer forming step.

3. The image-forming method according to claim 2, wherein a liquid layer formed on the intermediate transfer medium.

4. The image-forming method according to claim 1, wherein the thickening agent is a polysaccharide.

5. The image-forming method according to claim 4, wherein the polysaccharide is a cationic polysaccharide.

6. The image-forming method according to claim 1, wherein the thickening agent is a polysaccharide or a polyvinyl alcohol.

7. The image-forming method according to claim 1, wherein the colorant-aggregating component is a polyvalent metal ion or an organic acid.

8. The image-forming method according to claim 1, wherein the first ink layer has a yield value of 50 Pa or less.

* * * * *